US009875546B1

(12) United States Patent
Bhole et al.

(10) Patent No.: US 9,875,546 B1
(45) Date of Patent: Jan. 23, 2018

(54) COMPUTER VISION TECHNIQUES FOR GENERATING AND COMPARING THREE-DIMENSIONAL POINT CLOUDS

(71) Applicant: A9.com, Inc., Palo Alto, CA (US)

(72) Inventors: Chetan Pitambar Bhole, San Mateo, CA (US); Himanshu Arora, San Jose, CA (US); Eran Borenstein, Los Gatos, CA (US); Erick Cantu-Paz, San Jose, CA (US); Arnab Sanat Kumar Dhua, Mountain View, CA (US); Anish Ramdas Nair, Fremont, CA (US)

(73) Assignee: A9.COM, INC., Palo Alto, CA (US)

( * ) Notice: Subject to any disclaimer, the term of this patent is extended or adjusted under 35 U.S.C. 154(b) by 14 days.

(21) Appl. No.: 15/083,950

(22) Filed: Mar. 29, 2016

(51) Int. Cl.
    *G06T 7/00* (2017.01)
    *H04N 13/02* (2006.01)
    *G06F 1/16* (2006.01)
    *H04N 13/00* (2006.01)

(52) U.S. Cl.
    CPC ............ *G06T 7/0057* (2013.01); *G06F 1/163* (2013.01); *G06T 7/004* (2013.01); *H04N 13/0221* (2013.01); *H04N 13/0271* (2013.01); *G06T 2207/10028* (2013.01); *H04N 2013/0081* (2013.01)

(58) Field of Classification Search
    CPC combination set(s) only.
    See application file for complete search history.

(56) References Cited

U.S. PATENT DOCUMENTS

| | | | |
|---|---|---|---|
| 2006/0293151 A1* | 12/2006 | Rast ................... | A63B 21/0023 482/8 |
| 2008/0118886 A1* | 5/2008 | Liang .................. | A61B 5/0066 433/29 |
| 2011/0123122 A1* | 5/2011 | Agrawal .................. | G06T 7/74 382/203 |
| 2012/0313955 A1* | 12/2012 | Choukroun ............. | G06T 19/00 345/582 |
| 2014/0035913 A1* | 2/2014 | Higgins .................. | G06T 17/00 345/420 |
| 2016/0063613 A1* | 3/2016 | Zhao ................... | G06Q 30/0643 705/27.2 |
| 2017/0132486 A1* | 5/2017 | Boncyk ................ | G06K 9/4671 |

* cited by examiner

*Primary Examiner* — Jerome Grant, II
(74) *Attorney, Agent, or Firm* — Hogan Lovells US LLP

(57) ABSTRACT

Techniques to determine the three-dimensional structure of wearable items are disclosed. A scanning device can project waves at a wearable item and receive reflections of the waves. In embodiments, the scanning device projects light pulses and detects reflections of the light pulses. Depth measurements from the scanning device to the wearable item can be used to determine points corresponding to locations on the wearable item. A point cloud can be generated of the points, which can convey the three-dimensional structure of the wearable item. In embodiments, another wearable item can be determined to have a corresponding three-dimensional structure based on point cloud comparisons. The second wearable item can be suggested to a user as a wearable item having an appropriate fit for the user.

20 Claims, 8 Drawing Sheets

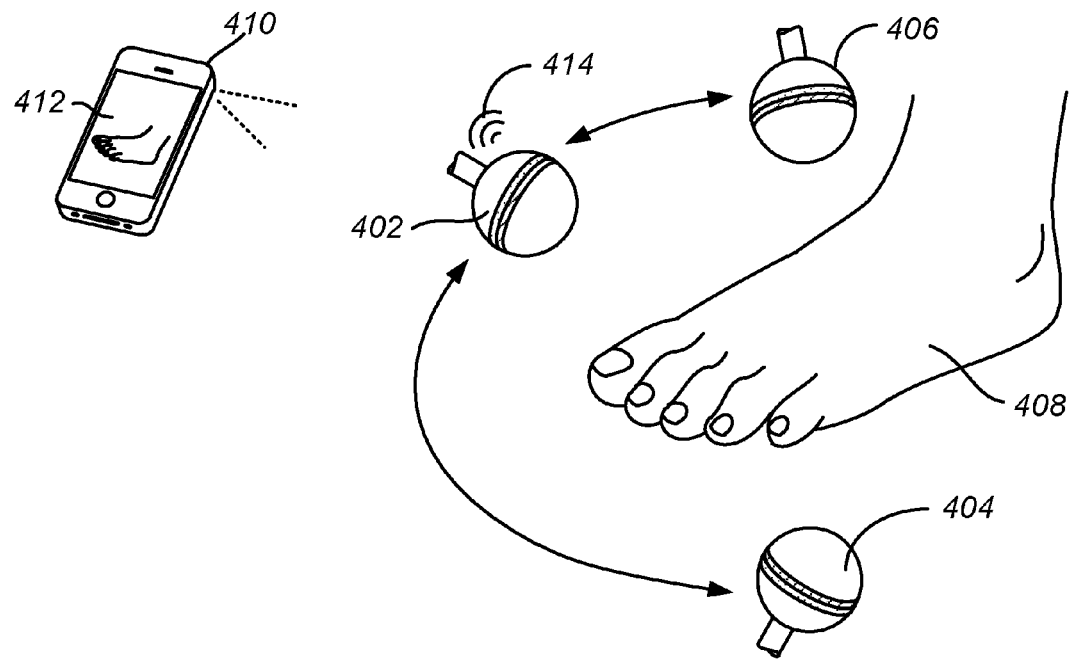
FIG. 4A
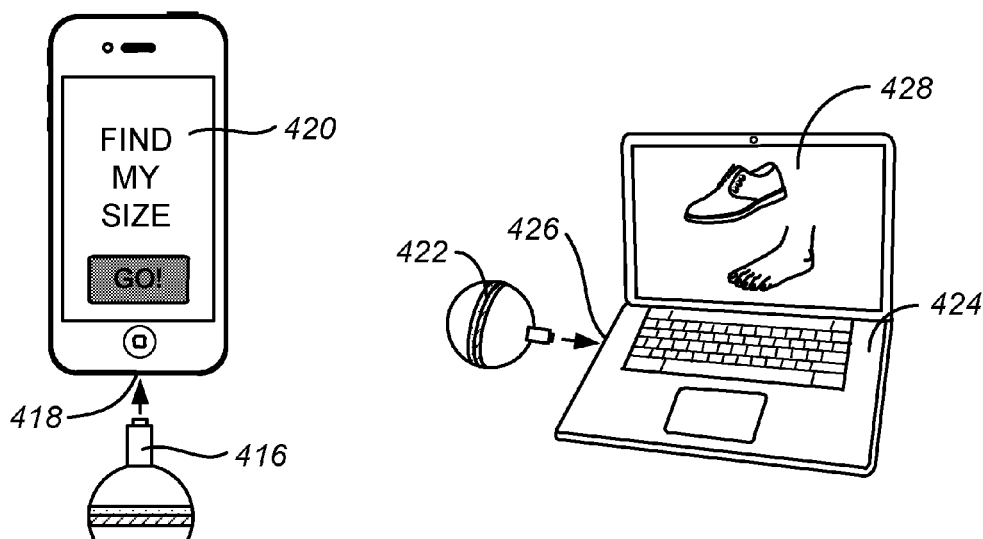
FIG. 4B
FIG. 4C

COMPUTER VISION TECHNIQUES FOR GENERATING AND COMPARING THREE-DIMENSIONAL POINT CLOUDS

BACKGROUND

Multiple standards exist for sizing wearable items, such as eyeglasses and jewelry. Various manufacturers and designers size their items according to any one of these standards, and occasionally develop new standards. It follows that a large shirt from one brand may be bigger than a large shirt from a different brand. Likewise, one brand's size 10 running shoe may fit differently than another brand's size 10 running shoe. In addition, some wearable items, such as rings and hats, are not sold in broad size categories, such as small, medium, and large. Instead, these items require precise measurements from a user to fit properly.

When the size of an item is needed, a user typically has to guess the proper size to select, particularly if the user is unfamiliar with the brand or manufacturer of the items. Because some speculation is involved, it can be difficult for a user to select the proper size on the first try. Unfortunately, this mistake often is not revealed until a user attempts to wear or use an item. If the user guessed incorrectly, as is often the case, the user must make a new selection based on how the "wrong" selection fit.

BRIEF DESCRIPTION OF THE DRAWINGS

Various embodiments in accordance with the present disclosure will be described with reference to the drawings, in which:

FIGS. 4A-C illustrate an example approach that can be utilized in accordance with various embodiments;

DETAILED DESCRIPTION

Figure 1:
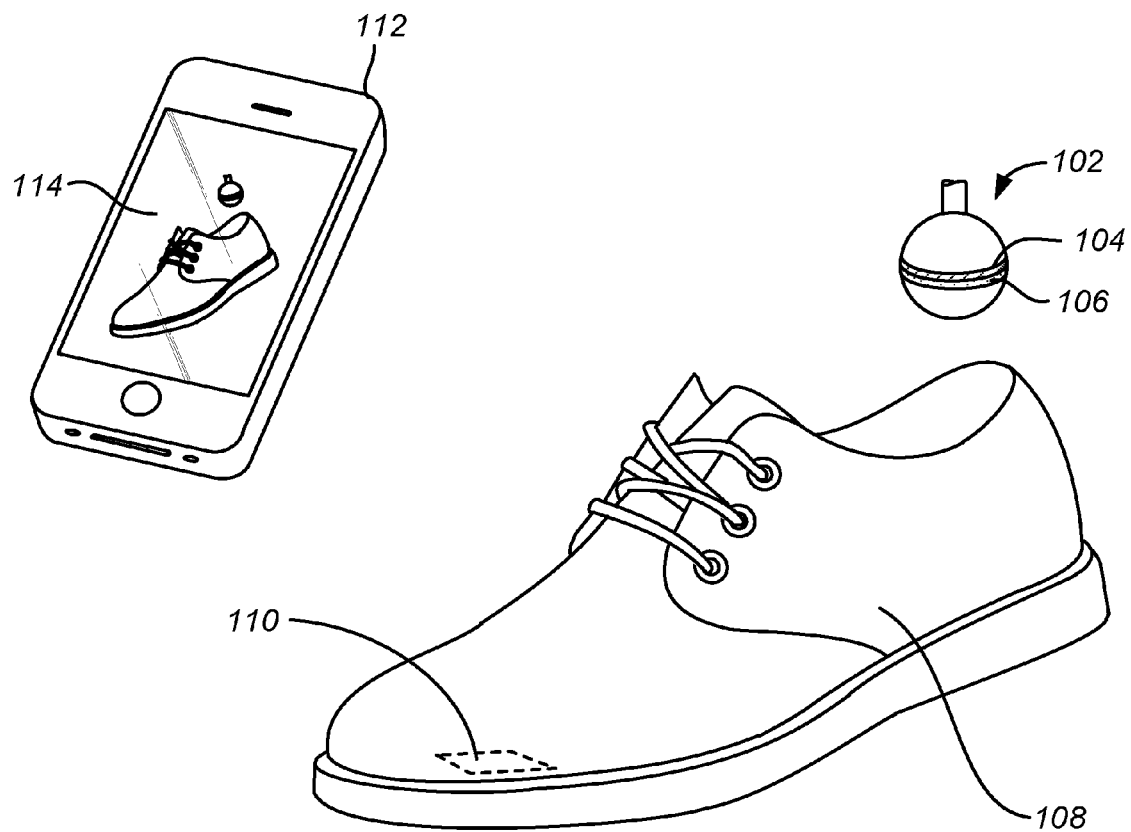
FIG. 1 illustrates an example approach that can be utilized in accordance with various embodiments.

Systems and methods in accordance with various embodiments of the present disclosure overcome one or more of the aforementioned and other deficiencies experienced in conventional approaches. In particular, various embodiments enable approaches to determining the size of a wearable item using object scanning and visualization techniques.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

According to various embodiments, a scanning device can be used to scan a wearable item. A wearable item, as used herein, can refer to clothing, shoes, accessories, and any other item that can be worn. For example, wearable items can include jeans, shoes, watches, eyeglasses, and hats. Scanning a wearable item can comprise moving the scanning device over regions of the wearable item. Points can be determined on the surface of the wearable item, and a plurality of points can be used to generate a point cloud. In embodiments, scans can be performed on other items, such as paper clips, coffee mugs, door handles, and other miscellaneous objects. A scan can be performed directly on a body part on which a wearable item is designed to be worn. For example, a foot can be scanned directly in embodiments.

A point cloud can convey two-dimensional or three-dimensional structure of the scanned wearable item based on the location of points determined to be present on the item. In embodiments, the point cloud can include points on the exterior surface of the item. For example, a tie can be placed on a table, and a scan over the top of the tie can generate a point cloud for the tie. The tie's length and width at various sections can be determined from the point cloud. In embodiments, the interior of a wearable item can be scanned, either in addition to or in place of the article's exterior. For example, the inside of a shoe can be scanned. A point cloud generated for the shoe can include information about the exterior and the interior of the shoe.

A mobile device can capture an image during scanning. For example, a video can be captured while the scanning device is passed over a wearable item. In embodiments, the scanning device may not "know" when it has already scanned a region or whether it has missed a region. Using a mobile device, for example, a point cloud can be registered as it is generated to address this issue. For example, the scanning device may pass over the same region more than once and may not pass over other regions at all. The captured image can provide information on redundant regions and gap regions of the point cloud for the wearable item. For example, a captured image can show that the first minute of a scan and the fifth minute of a scan both focused exclusively on the heel of a high heel shoe. The captured image can further show that the toe of the shoe was not scanned. Therefore, points determined during the first minute and the fifth minute of the scan can be determined to all belong to the heel region when the point cloud is generated. A user can also be prompted to scan the toe if it is determined that the point cloud for the shoe lacks points from the toe region.

In embodiments, a reference marker can be attached to the wearable item that is scanned. Movement of the reference marker can be used to determine a change in position and orientation, or pose, of the wearable item. Thus, the reference marker can provide data on where the scanning device has scanned the wearable item based on the pose of the wearable item. The reference marker can include one or more sensors, such as one or more accelerometers or one or more gyroscopes. In embodiments, the reference marker is an active transmitter, which sends position information to a mobile device, another computing system, or the scanning device itself. In embodiments, the reference marker is passive. For example, the reference marker can be a near-field communication (NFC) tag. A corresponding NFC scanner on the scanning device can transmit a signal to read the NFC tag. In embodiments, a Bluetooth or other wireless connection can link the scanning device and the reference marker.

FIG. 1 illustrates an example approach in accordance with various embodiments. A scanning device 102 can be used to scan a wearable item 108. The scanning device 102 can include a transmitter 104 and a receiver 106. The transmitter 104 can project a focused signal or wave in the direction of the wearable item 108. In embodiments, the transmitter 104 can project a signal in all directions. The projected signal can be reflected from nearby objects back to the receiver 106 of the scanning device. When the receiver 106 detects that the transmitted signal has been reflected and received, a depth measurement from the scanning device to the reflective surface can be recorded. This depth measurement corresponds to a point on the wearable item 108. Various techniques can be used to ensure that only surfaces close to the scanning device reflect waves projected from the transmitter 104. For example, the projected signal can have a very large wavelength, so nearby objects will produce a reflection while noise from further objects will be reduced. In embodiments, objects beyond the scanned item can reflect projected waves. Thus, a depth measurement may be recorded of an object beyond the wearable item. These depth measurements can be filtered out, however, so that only depth measurements within a threshold range of the scanning device are registered as being associated with the wearable item. For example, the interior of a shoe may be scanned. If the shoe is placed six inches from a lamp during scanning, however, the scanning device may detect points on the lamp in addition to the interior of the shoe. Thus, any depth measurements greater than three inches away can be filtered out, such that the final output includes only those points that correspond to reflections caused by the shoe. The filtering process can be manually adjusted or automatically adjusted based on detected noise. As discussed in more detail below, a plurality of points on the wearable item 108 can be used to generate a point cloud for the wearable item 108.

In embodiments, the points making up the point cloud are registered as they are determined. For example, a mobile device 112 can be used to capture an image 114 of the scanning. The image 114 can provide a global sense of the scanning process. In embodiments, when the scanning device 102 detects a point on the wearable item 108, the point can be registered in the appropriate location of the captured image 114. In embodiments, the location of the point can be recorded, but it may not be visible to a viewer of the captured image 114. In embodiments, the point can be visible to a viewer of the captured image 114. For example, as the point cloud is generated, the captured image can show the point cloud superimposed on the representation of the wearable item in the image. That is, an overlay of the point cloud can be shown on the wearable item from which the point cloud was generated.

In embodiments, the wearable item 108 and the scanning device 102 can both be in motion at various times during the scanning process. Various techniques can be used to take such motion into account during scanning. For example, capturing an image 114, as described above, can show such motion. In embodiments, a reference marker 110 can be attached to the wearable item 108 to provide position and orientation, or pose, information for the wearable item 108 with respect to the scanning device 102. In the embodiment illustrated in FIG. 1, both a captured image 114 on a mobile device 112 and a reference marker 110 are used to take motion of the scanning device 102 and the wearable item 108 into account as the point cloud is registered.

In embodiments, the reference marker includes an active transmitter and one or more sensors, such as accelerometers and gyroscopes. The sensors can provide data on the movement of the reference marker 110 and consequently the wearable item 108. This data can be used to determine the completeness of a scan. For instance, it may be determined that the point cloud near the toe of a shoe requires additional points to properly visualize the toe region. In embodiments, the reference marker 110 actively transmits data to another source. This source can be, for example, the scanning device 102, the mobile device 112, or another computing system. In embodiments, the reference marker is passive. For example, the reference marker 110 may store position data, and the scanning device 102 can periodically interrogate the reference marker 110 to collect this data. In embodiments, position data for the reference marker 110 can be stored locally on the reference marker's memory. The position data can be stored, for example, with time stamps. This position data can later be collected along with time stamped data from the scanning device 102 and/or the mobile device 112. This data can be integrated to provide pose information on the wearable item 108 throughout the scanning process.

In embodiments, the reference marker 110 is a fiducial reference. For example, the reference marker 110 can be an adhesive with a distinctive color or pattern relative to the wearable item to which it is attached, or it can otherwise be detectable in an image. For example, the reference marker 110 can be an adhesive QR code or a bright pink sticker. In embodiments, the reference marker 110 can be tracked in a captured image of the wearable item 108. The tracking can be continuous or periodic. The position of the reference marker 110 in the captured image 114 can provide information on the pose of the wearable item 108 with respect to the scanning device 102.

Regardless of the specific type of reference marker used, the reference marker 110 can be affixed to the wearable item 108. Because the reference marker 110 is in a fixed location on the wearable item, it can be determined that a change in position of the reference marker corresponds to a change in pose of the wearable item 108 with respect to the scanning device.

Figure 2:
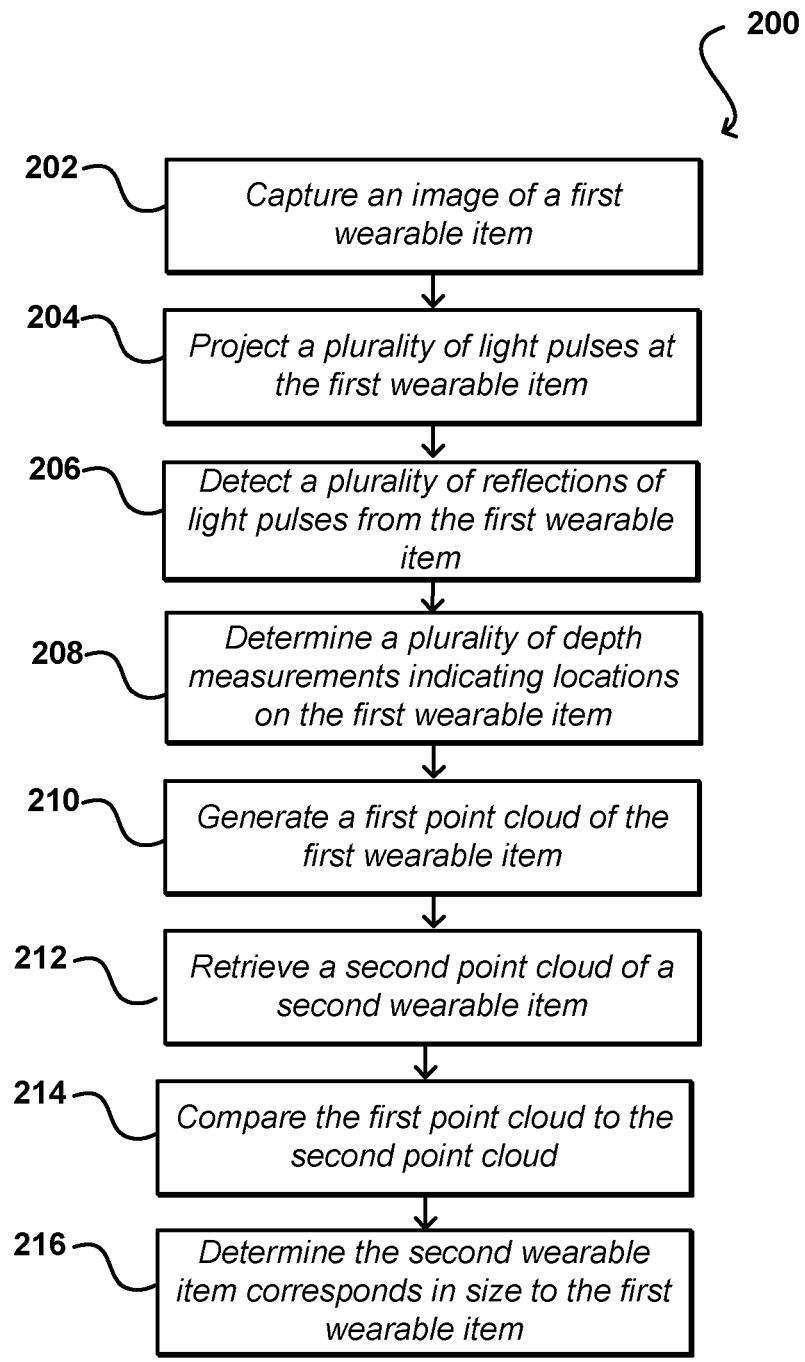
FIG. 2 illustrates an example process that can be utilized in accordance with various embodiments.

FIG. 2 describes an example process 200 that can be utilized in accordance with various embodiments. An image can be captured of a first wearable item 202. As used herein, image can include stills, video, or other forms of visual data. For example, an image can include multiple frames of image data. Additional aspects of images and image capture elements are discussed with respect to the example mobile device illustrated in FIG. 7.

Embodiments can include transmitting a plurality of light pulses to the first wearable item 204, for example from a rotating light radar (LIDAR) transmitter, as discussed more thoroughly below. A plurality of reflections of the light pulses can be detected 206 after striking and returning from the first wearable item. For example, a rotating LIDAR receiver can be used to detect reflections of light pulses transmitted from a rotating LIDAR transmitter. The elapsed time between transmitting a light pulse and detecting its reflection can be used to determine a depth measurement. A depth measurement, as used herein, refers to the distance between the scanning device and the wearable item being scanned. For example, a light pulse can be transmitted from a LIDAR transmitter, reflected from a wearable item, and the reflection can be detected by a LIDAR receiver. The time elapsed between transmission and detection can indicate, for instance, that the scanning device is one inch away from the wearable item. This can indicate that, at that particular moment in time, a location one inch from the transmission source of the scanning device is a location on the first wearable item. Thus, a plurality of depth measurements indicating a plurality of locations on the first wearable item can be determined 208.

In embodiments, depth measurements use phase detection techniques. A projected wave can be determined to have a certain modifiable frequency. Based on the frequency, a sinusoidal function of the wave can be determined. For example, a wave W can be projected at an item. When W returns to the source of projection, another wave W' can be projected. For simplicity, only W and W' are discussed here, though it will be understood that other waves may be projected before W, after W', and in between W and W'. Because the frequency of W and W' are known, we can determine the phase difference between W and W'. The phase difference between these two waves will be dependent on how far W traveled before reaching the source of projection. In embodiments, the phase of W can be detected without comparison to W'. For example, when W returns to the source of projection, it can be determined at what phase in the sinusoidal function of W the wave is in. The phase of W will be dependent on the amount of time W spends traveling to and returning from the item being scanned.

In embodiments, a user can be prompted on the progress of scanning. For example, a user interface can indicate that a certain region has been scanned already, that all regions have been scanned, or that a certain region has not been scanned or should be rescanned for clarity. There are a number of ways to determine the completeness of a scan. For example, a reference marker, such as the reference marker described above, can aid in determining which portions of a wearable item have been scanned. A reference marker can transmit its position relative to the scanning device. Because the reference marker is affixed to one location on the wearable item, movement of the reference marker can also be used to determine the pose of the wearable item with respect to the scanning device. Thus, it can be determined that a first subset of depth measurements corresponds to a first region of the wearable item, for instance the heel of a shoe. Motion of the reference marker can be detected, for example using an embedded accelerometer. It can then be determined that the motion of the reference transmitter caused a pose change of the first wearable item with respect to the scanning device. For example, if the reference marker is attached to a shoe and the reference marker was originally far from the scanner and to the left, and it is now close to the scanner and to the right, it can be determined that the heel of the shoe was being scanned originally, but the shoe has been turned around so the toe of the shoe is being scanned currently. In embodiments, it may not be clear exactly which region of the shoe was being scanned and which region is being scanned after a pose change. In embodiments, however, it is noted that the second region being scanned is different from the first region being scanned based on the change in pose. In other words, it can be determined that a second subset of depth measurements corresponds to a second region of the first wearable item based at least in part upon a pose change.

In embodiments, a pose change can be detected in an image captured by a mobile device. For example, computer vision techniques can be used to determine the spatial positions of the scanning device and the wearable item being scanned. In embodiments, it can be determined that a first subset of depth measurements corresponds to a first region of the first wearable item. For example, a captured image can register that a first subset of depth measurements is recording points on the heel of a shoe. It can be determined that the pose of the first wearable item changes with respect to the scanning device in the image. For example, in a first frame of image data, the scanning device may be proximate the heel of a shoe, while in a second frame of image data, the scanning device may be proximate the toe of the shoe. Thus, in general, the pose change detected in the image may show that a second region is closer to the scanning device than the first region. It can then be determined that depth measurements recorded during the second frame of image data are pinpointing locations on the second region of the wearable item, rather than the first region. Throughout the scanning process, points can be registered in this manner, either on the scanning device, the mobile device, or another computing system. That is, as a plurality of points are recorded with the depth measurements, it can be determined the extent to which the scanning device has repeated or skipped certain regions of a wearable item.

A first point cloud can be generated of the first wearable item 210. The point cloud can include the plurality of points corresponding to the plurality of locations on the first wearable item that were determined by the depth measurements. A second point cloud representing a second wearable item can be retrieved 212. The second point cloud can also include a plurality of points corresponding to a plurality of locations on the second wearable item. For example, in embodiments, point clouds representing numerous wearable items can be stored in and retrieved from a database of an electronic marketplace. The point clouds for the other wearable items can be generated in the same manner as discussed above with respect to the point cloud generated for the first wearable item. For example, a retailer can use a scanning device, such as the scanning devices discussed with respect to various embodiments, to scan its inventory. Thus, point clouds representing various items in a retailer's inventory can be stored in a database.

The first point cloud can be compared to the second point cloud 214. In embodiments, a random sample consensus can be used to show how the points in the first point cloud compare overall to the points in the second point cloud, while taking outliers into account. In embodiments, a plurality of points in the first point cloud can be assigned to a respective plurality of points in the second point cloud. It is not necessary for there to be the same number of points in each point cloud. A point in the first point cloud will be assigned to its closest counterpart in the second point cloud, with the understanding that some points in the second point cloud, if the second point cloud includes more points, will not receive an assigned point. A mapping can be determined between a point in the first point cloud and its assigned point in the second point cloud. This mapping can determine which transformations move the point in the first point cloud to its assigned point in the second point cloud. For example, a point A may be 2 mm away from its assigned point A'. The mapping will show that a translation of 2 mm maps A to A'. This mapping can be performed for each point in the first point cloud or for some threshold number of points. An overall mapping from the first point cloud to the second point cloud can be determined in this manner. In embodiments, the first point cloud is mapped to a plurality of alternative point clouds in this manner. It can be determined that the mapping from the first point cloud to one of these alternative point clouds corresponds to the best fit because that mapping includes fewer and/or smaller transformations.

This comparison can provide a sense of how similar or different the first wearable item is to the second wearable item. The comparison can also be performed on a region by region basis. For example, a user may scan her shoe in an attempt to find a similarly sized shoe. But the user may find the fit around the toe to be the most important aspect of her current shoes. Thus, a user can indicate that the toe region is relatively more important than other regions in determining the overall fit of her currently owned shoe. For instance, the user can assign a weight to the toe region, or any other region, in the first point cloud, which represents the shoe she scanned. The weight can be qualitative, e.g. low importance, high importance, etc., or quantitative, e.g. a number score on a range from 0 to 100. When the first point cloud is compared to several additional point clouds, the overall comparison may show that the first point cloud is equally similar to more than one additional point cloud. However, it can be determined that a statistical similarity between the first point cloud and a second point cloud in the weighted region indicates a better weighted fit than the same statistical similarity between the first point cloud and a third point cloud in a non-weighted region. For example, a user may select the toe region as being very important to a good fit. Her scanned shoe may be overall similar to a second shoe in which the toe region is a perfect fit, but the heel is slightly off. Her scanned show may also be overall similar to a third shoe in which the toe region is a little off, but the heel is a perfect fit. Because the user assigned a weight to the toe region, it can be determined that the second shoe is a better weighted fit, i.e. a better fit when the user's preferences are given weight, even though the third shoe should fit equally well overall.

After comparing the first point cloud to the second point cloud 214, it can be determined that the second wearable item corresponds in size to the first wearable item 216. A correspondence in size indicates that the second wearable item would fit a user similarly to the first wearable item. This does not necessarily mean that the size labels of the manufacturers correspond. In fact, it may be that because the first wearable item and the second wearable item are made by different manufacturers, techniques described herein are used to determine which label size of the second wearable item corresponds in physical size to the label size of the first wearable item. Thus, size, as used herein, also refers to physical shape, and can refer to other aspects relevant to the fit of an item of clothing.

Figure 3A:
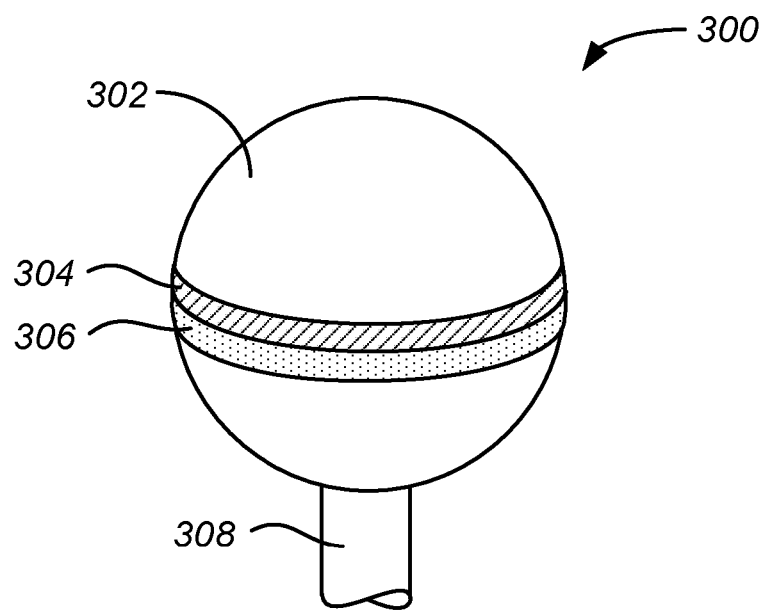
FIGS. 3A-B illustrate an example approach that can be utilized in accordance with various embodiments.
Figure 3B:
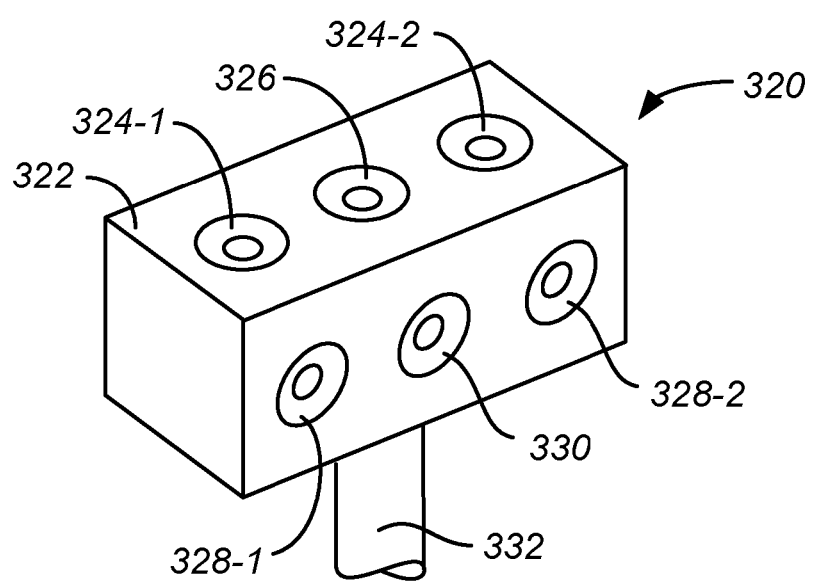

FIGS. 3A-B illustrate aspects of various scanning devices that can be used according to embodiments of the invention. In the embodiment shown in FIG. 3A, a scanning device 300 can have a lollipop form factor with a substantially spherical or round head 302 and a handle 308. The handle 308 can provide a grip for a user. It can also include communications means, such as a connector or wiring suitable for data transfer. In embodiments, the handle 308 is made of a flexible material and can be bent to allow the head 302 to reach into a wearable item at various angles. For example, the handle 308 can be bent at a right angle to provide easier access for the head 302 into the interior toe region of a tall boot. In embodiments, wireless communications means can be included in the scanning device 300, for example in the round head 302 of the scanning device. The round head 302 can include a rotating transmitter and a rotating receiver.

For example, the round head 302 can include a rotating LIDAR receiver 304 and a rotating LIDAR transmitter 306. The rotating LIDAR transmitter 306 rotates substantially about an axis of the scanning device 300. In embodiments, the axis of rotation runs from the point on the round head 302 opposite the handle 308, through the center of the round head 302 to the point of the round head 302 substantially centered on the handle 308. The rotating LIDAR receiver 304 can rotate about the same axis as, and in synchronization with, the rotating LIDAR transmitter 306.

As noted above, a LIDAR transmitter and receiver comprise an example of a transmitter and receiver that can be used according to embodiments. A LIDAR transmitter can transmit light pulses, which are reflected from nearby objects. The reflected light is then detected by a LIDAR receiver. In embodiments, a transmitter can produce a different signal in addition to or in place of light. For example, according to various embodiments, sound waves can be transmitted by an ultrasound or other appropriate transmitter and reflections of sound waves can be received by an ultrasound or other appropriate receiver.

In embodiments, points can be detected on the surface of a wearable item using depth cameras. FIG. 3B illustrates a scanning device 320 with multiple depth cameras. The scanning device 320 of FIG. 3B is shown with a rectangular prism head 322. The interior of the rectangular prism head 322 can include components and carry out functions such as those mentioned with respect to the round head 302 of FIG. 3A. Likewise, the handle 332 of scanning device 320 can function similarly to the handle 308 of scanning device 300. In embodiments the head of the scanning devices 300, 320 can be smaller than the opening to an interior region of a wearable item to be scanned. For example, in embodiments the scanning devices can scan a shoe. The heads of the scanning devices can be smaller than the opening to the inside of the shoe to enable physical access to the inside of the shoe.

As illustrated in FIG. 3B, multiple cameras can be positioned on any given surface of the rectangular prism head 322. For example, two depth cameras 324-1 and 324-2 can be placed at a given distance from one another. The distance between the depth cameras can be modified depending on the preferred depth measurement range. Generally, the closer the preferred scanning distance, the closer the distance between the depth cameras 324-1 and 324-2. The perceived distance between one depth camera 324-1 and a point on a wearable item can be compared to the perceived distance between a second depth camera 324-2 and the same point on the wearable item. The difference in these two perceived distances can be used to determine the actual depth measurement from the scanning device 320 to the point observed by both depth cameras. In embodiments, a projector and camera pair can be used to record depth measurements. For example, a projector can be positioned at 324-1 and a camera can be positioned at 324-2. The projector can project an image onto the wearable item. This projected image can be a symbol or pattern for example. The camera can collect visual data of the wearable item, including visual data showing the projected image. Based on characteristics of the projected image, the distance between the scanning device and the projected image can be determined. For example, the size, rotation, or distortions of the projected image can be used to determine how far away the scanning device is from the wearable item.

An RGB camera 326, or a camera that provides color imaging with three different color components—red, green, and blue—can be used to collect additional data. This additional data can include additional depth information. In embodiments, the additional data can relate to aesthetic of fashion-based considerations. For example, the RGB camera 326 can determine the color of the wearable item. A recommendation can be generated not just based on sizing considerations, but also colors or patterns determined during the scan. In embodiments, an RGB camera 326 can detect texture during the scan. Texture information can be used, for example, to determine whether a boot has a fur lining in which case a boot with a similar fur lining can be recommended to a user. In embodiments, more than one surface of the scanning device 320 can be equipped with cameras. For example, the three major surfaces of the rectangular prism head not connected to the handle 332 can each be equipped with a trio of cameras, such as two depth cameras and an RGB camera. FIG. 3B illustrates a second surface of the rectangular prism head 322 with two depth cameras 328-1, 328-2 and an RGB camera 330.

As illustrated in FIG. 4A, the scanning device 402 can be used not just to scan an existing wearable item but also to scan a body part directly. For example, a user may not have a shoe that fits just right. The user can choose to scan her foot 408 directly. Using techniques, such as those described above, a point cloud can be generated for the user's foot 408. The scanning device 402 can be moved about the foot 408 into multiple positions 404, 406. As noted above, a mobile device 410 can capture an image 412 of the scanning process. In embodiments, a real-time or near real-time transmission 414 can convey scanning data from the scanning device 402 to the mobile device 410. A reference marker, for example having the properties of the reference marker 110 discussed above, can be used even without a wearable item. For example, a reference marker can be affixed directly to a user's foot 408 or other body part and provide pose information of the body part in a manner similar to that described above for collecting pose information on a wearable item during scanning.

As illustrated in FIG. 4B, in embodiments, scanning data is stored locally on the scanning device 416 until a scan is complete. The scanning device 416 can be connected to a mobile device at a suitable data transfer port 418, such as, to name some examples, a Universal Serial Bus (USB) port, a USB Type-C port, or a 3.5 mm auxiliary port that can be used for the connection of audio peripherals. In embodiments, the act of connecting the scanning device 416 can activate the user interface 420 of a computing application configured to provide a user with suggested wearable items that correspond in size to the scanned article or body part. As illustrated in FIG. 4C, other computing devices, such as a laptop 424 can be used as well. For example, the scanning device 422 can be physically connected to the laptop 424 via an appropriate port 426. An example interface 428 is illustrated in which a user can view the scanned body part, such as the foot 408 of FIG. 4A, and a wearable item determined to be an appropriate fit for the scanned body part.

Figure 5:
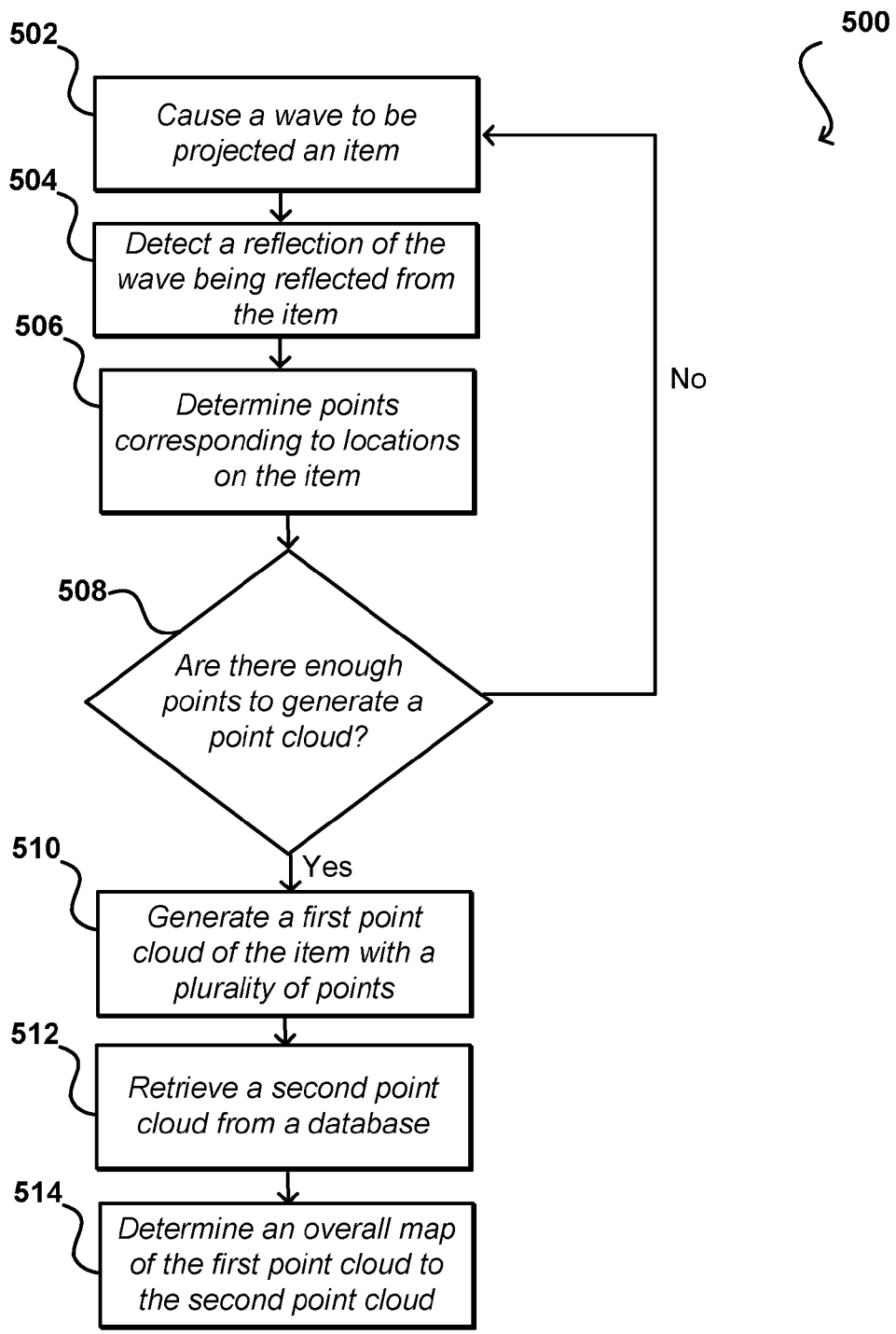
FIG. 5 illustrates an example process that can be utilized in accordance with various embodiments.

FIG. 5 illustrates an example process 500 according to various embodiments. A wave can be projected at an item 502. The item can include a wearable item. In embodiments, the item can include another item for which a size is needed. For example, if a doorknob needs to be replaced, a user may want a doorknob of the exact same size to match the other doorknobs in her house. Although embodiments have been described with respect to LIDAR, other waves can be projected. For example, acoustic waves can be projected. In embodiments, ultrasound waves are projected by an ultrasound transmitter, and reflections are detected by an ultrasound receiver. In embodiments, electromagnetic waves are used. For example, as described above, light pulses can be transmitted and detected respectively at a LIDAR transmitter and LIDAR receiver. Ultrasound and other acoustic waves travel at a slower speed than electromagnetic waves. In embodiments, depth measurements can be measured using time of flight of acoustic waves because acoustic waves spend relatively longer in flight.

The projected wave can be reflected from the item and detected 504 using a receiver that is appropriate for the projected wave. Points corresponding to locations on the item can be determined 506, for example using techniques described above with respect to depth measurements recorded based on the time elapsed between transmission and detection of the wave. Depth measurements can also be recorded using phase detection techniques as discussed above. In embodiments, each projected wave results in a group of detected points on the item. This process can be repeated until enough points have been recorded to generate a point cloud representing the item. If there are not enough points to generate a point cloud 508, then steps 502, 504, and 506 can be repeated. For example, it may be determined that a certain region of the item was not scanned properly in which case a user may be prompted to scan the region again. If it is determined that there are enough points to generate a point cloud 508, then a point cloud is generated with the plurality of points corresponding to locations on the item 510.

An second point cloud representing a second item can be retrieved 512 from a database, including in embodiments a database of an electronic marketplace. For example, if a user has scanned her shoe, point clouds representing one or more additional shoes can be retrieved from a database. For brevity, the first point cloud and a single alternative point cloud are discussed in this section, though it will be understood that a plurality of point clouds can be retrieved respectively representing a plurality of additional items. In embodiments, each point of the first point cloud is determined to correspond to a point in the second point cloud. A mapping is determined for each point in the point cloud to each point in the second point cloud. Because the second point cloud may have been generated by different means, there may not be a one-to-one correspondence in points between the point clouds. A mapping can be determined nonetheless based on the points in each point cloud determined to correspond to one another. This mapping can be iterated for additional points in the point cloud to determine an overall mapping from the original point cloud to the second point cloud 514. That is, the mappings for each point can be summed or otherwise compiled to determine an overall mapping. If this technique is applied to a plurality of alternative point clouds, it can be determined that the original point cloud maps to one of the alternative point clouds with the fewest or least intensive transformations. In other words, it can be determined that the points of the point cloud are generally closer to the points of one other alternative point cloud than to the points of any other alternative point cloud. A user recommendation can be generated for the point cloud that results in the closest match. Moreover, a visual representation can be generated of the three-dimensional structure of the item represented by the first point cloud, including the structure of interior portions not normally visible to a user, such as the arch in the interior of a shoe.

In embodiments, after a point cloud is generated, a user can provide additional data to modify the point cloud before the point cloud is correlated to other point clouds. For example, a user can scan a first item, such as a shoe. In embodiments, the user can annotate the scan with audio data. For example, before, during, or after the scan, the user can say, "I want shoes like this with a higher arch." This audio can be detected by a mobile device capturing an image of the item, the scanning device itself, or by other means. Then, when the point cloud of the item is generated, the user input can be taken into account and the arch can be raised slightly before searching for shoes corresponding in size. Thus, a user recommendation can be generated for a second shoe having a three-dimensional structure based on the three-dimensional structure of the scanned shoe in addition to the modification described in the audio file. In embodiments, the modification is provided by text input. For example, the user can scan a shoe and then type into a text input field, "I want shoes like this in black." Thus, the user's aesthetic or fashion preferences can be taken into account in addition to any structural or fit commentary. In embodiments, the user can provide modification data by touch input. For example, after a scan, a user may view the generated point cloud on her mobile device. The user can manipulate the point cloud before looking for comparisons in certain embodiments. For example, the user can elongate the heel of a high heel shoe. Then, additional point clouds retrieved from a database can be those that have three-dimensional structures matching the scanned high heel shoe, along with the longer heel requested by the user.

Figure 6A:
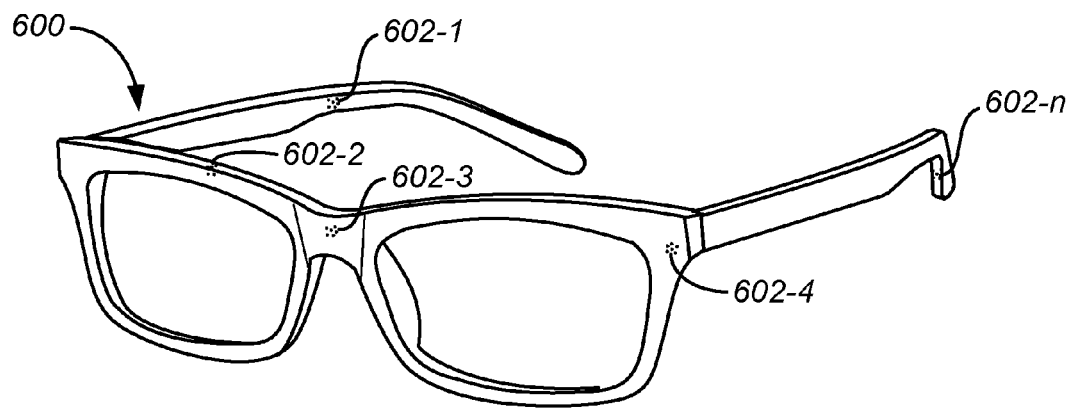
FIGS. 6A-B illustrates an example approach that can be utilized in accordance with various embodiments.
Figure 6B:
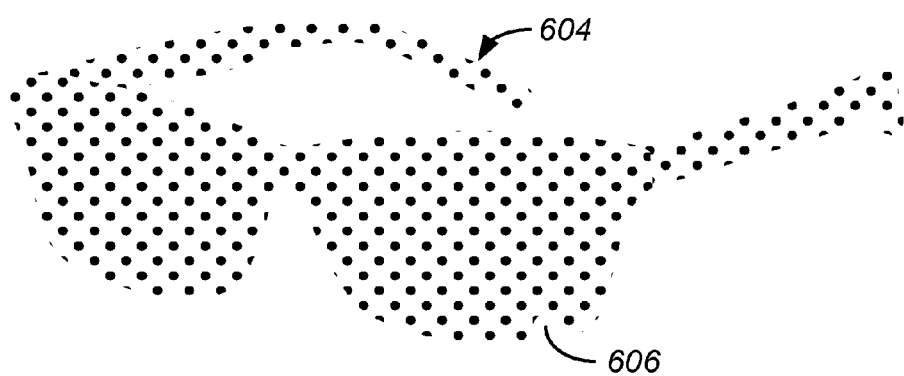

FIGS. 6A-B illustrate the relationship between an object and its point cloud according to various embodiments. A scanning device, such as one discussed above with respect to various embodiments, can be passed over an object, such as eyeglasses 600. Using techniques described above, points on the surface of the eyeglasses 600 can be located. In the example provided, n groups of points have been determined for the eyeglasses 600. That is, it has been determined that the groups of points labeled 602-1, 602-2, 602-3, 602-4, and so on until group 602-n are all present on the eyeglasses 600. This data can be used to generate a point cloud 604 for the eyeglasses 600 as illustrated in FIG. 6B. The point cloud 604 can provide a three-dimensional structure of the eyeglasses 600, such that a user can be provided similar eyeglasses of the same size and shape. In embodiments, the point cloud can provide two-dimensional structure. For example, a user may be looking for replacement lenses to fit into the same frame in which case the user may want to provide the height and width of the existing lenses. The curvature of the lenses, for instance, may be determined by the user's prescription and thus may not need to be provided from the point cloud.

In embodiments, the point cloud may contain certain gap regions such as the gap region 606 in the point cloud 604 of the eyeglasses. The gap region 606 may arise because the user did not properly scan that section of the eyeglasses 600. Another reason for a gap region may be noise introduced into the scan that prevents a clear reading at the gap region 606. The user may be prompted to scan the area of the eyeglasses 600 that corresponds to the gap region 606. For example, the user may be shown a visualization of the point cloud 604 with gap region 606 highlighted. In embodiments, the gap region 606 can be accounted for and the point cloud 606 can be completed based on existing data. For example, it can be determined that the point cloud 604 represents a pair of eyeglasses 600 based on characteristics of the existing point cloud 604. Because eyeglasses are typically symmetrical, the gap region 606 can be filled in using the corresponding section on the other side of the point cloud 604. In embodiments, interpolation techniques can be used to fill in a region when surrounding regions have been scanned.

Figure 7:
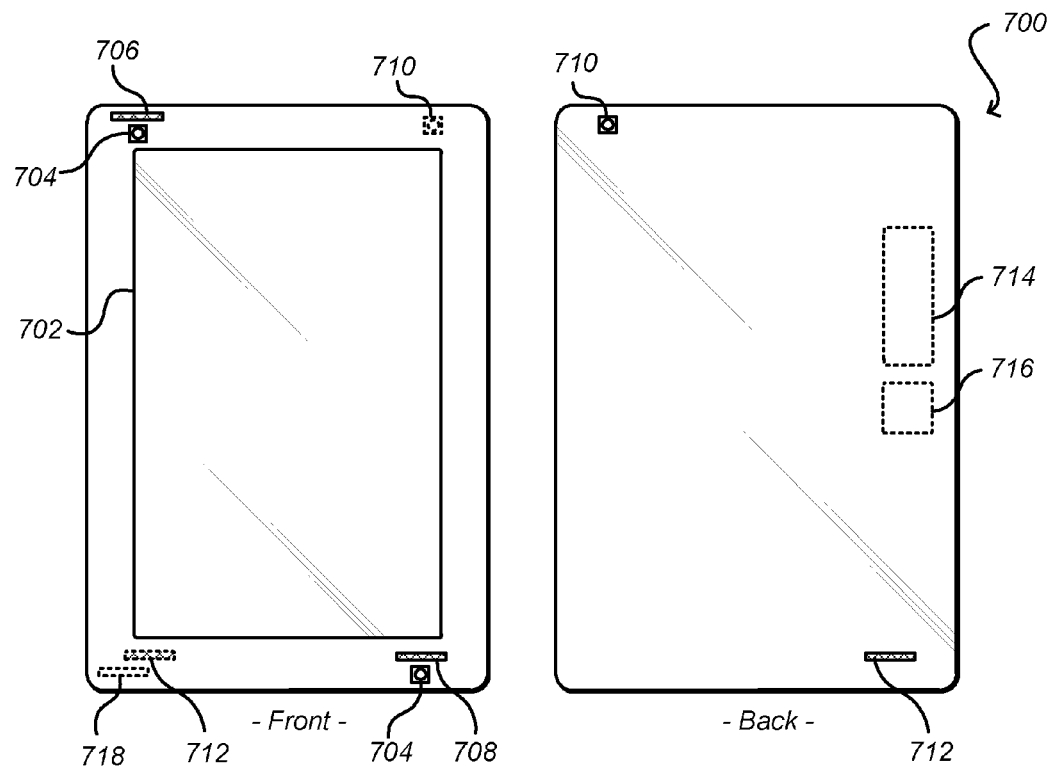
FIG. 7 illustrates an example mobile device that can be utilized in accordance with various embodiments.

FIG. 7 illustrates front and back views of an example mobile device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the mobile device 700 has a display screen 702 (e.g., an LCD element) operable to display information or image content to one or more users or viewers of the device. The display screen of some embodiments displays information to the viewers facing the display screen (e.g., on the same side of the computing device as the display screen). The mobile device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the mobile device can use the images (e.g., still(s) or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The mobile device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
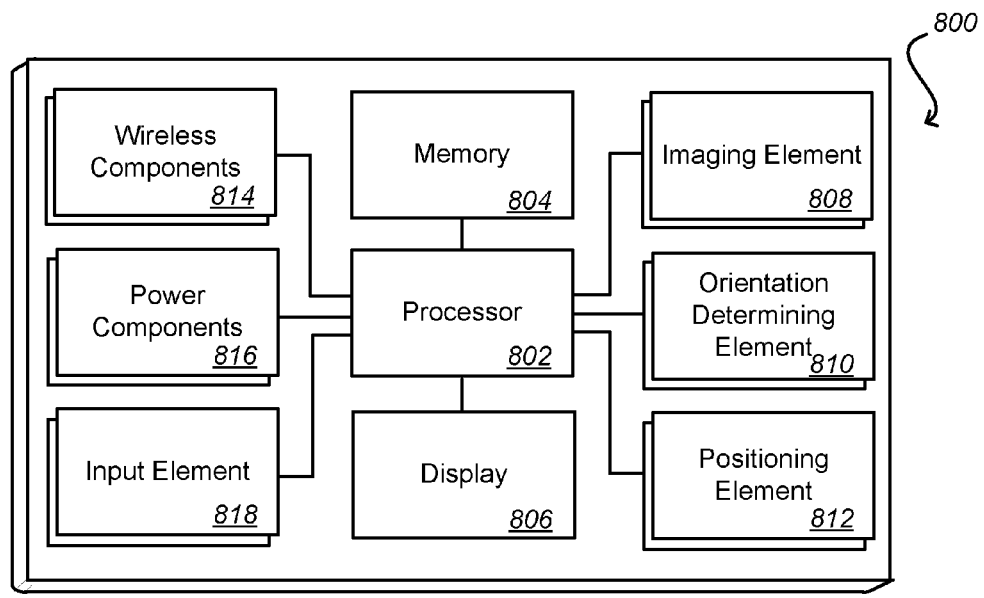
FIG. 8 illustrates an example environment that can be utilized in accordance with various embodiments.

FIG. 8 illustrates a set of basic components of an electronic computing device 800 such as the device 700 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example mobile device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments may include at least a positioning element 812 for determining a location of the device (or the user of the device). Thus, in embodiments, it may be determined that the user of the device is in a cold climate, and search results may take this into account by ranking, for example, snow boots over rain boots, or otherwise factoring in the user's location. A positioning element can include or comprise a GPS or similar location-determining elements operable to determine relative coordinates for a position of the device. Positioning elements may include wireless access points, base stations, etc., that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a mobile device (e.g., using GPS), the mobile device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the mobile device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
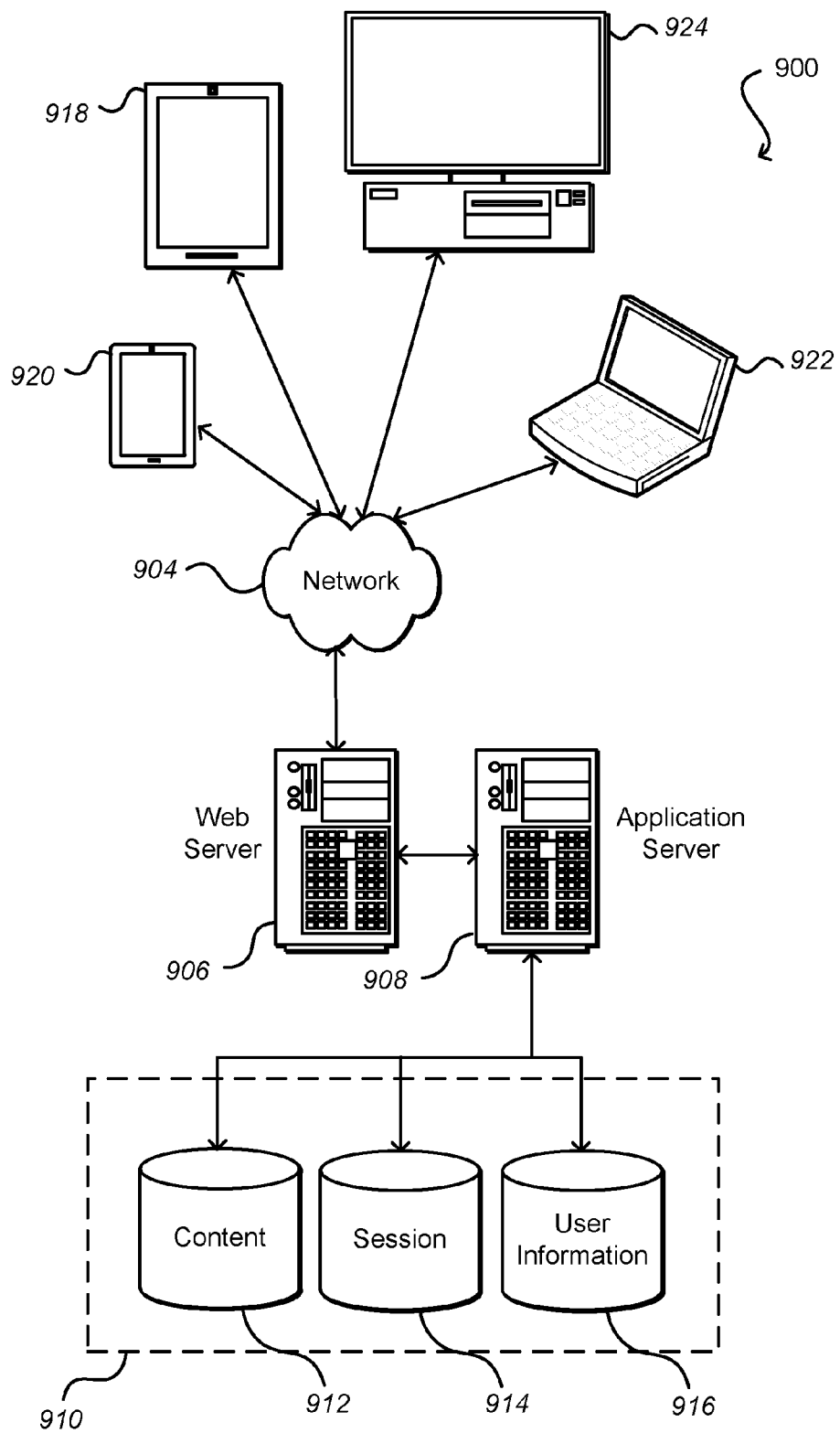
FIG. 9 illustrates an example environment that can be utilized in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes electronic client devices 918, 920, 922, and 924, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. In some examples, multiple devices may be used in conjunction with one another.

The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client devices 918, 920, 922, and 924 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 918, 920, 922 and 924. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Various systems, devices, methods, and approaches described herein may be implemented on one or more general-purpose and/or specific computing devices, such as under the control of one or more computer systems configured with executable instructions, the computer systems for example having one or more processors which may be communicatively coupled to other components such as one or more memory units that may store the instructions for execution. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present techniques, such as those set forth in the claims.

What is claimed is:

1. A system comprising:
a scanning device, the scanning device comprising:
a rotating light radar (LIDAR) transmitter, the rotating LIDAR transmitter rotating about an axis of the scanning device,
a rotating LIDAR receiver, the rotating LIDAR receiver rotating about the axis of the scanning device in synchronization with the rotating LIDAR transmitter;
a mobile device, the mobile device including an image capture element;
at least one processor; and
memory including instructions that, when executed by the at least one processor, cause the system to:
capture, with the image capture element of the mobile device, an image of a first wearable item;
project a plurality of light pulses from the rotating LIDAR transmitter at the first wearable item;
detect a plurality of reflections of light pulses from the first wearable item at the rotating LIDAR receiver;
determine phase differences between one or more projected light pulses of the plurality of light pulses and one or more detected reflections of the plurality of reflections;
determine a plurality of depth measurements between the scanning device and a respective plurality of locations on the first wearable item based at least in part upon the phase differences, a depth measurement indicating a distance between the scanning device and a location on the first wearable item, the plurality of depth measurements indicating a plurality of locations on the first wearable item;
generate a first point cloud of the first wearable item, the first point cloud including a plurality of points corresponding to the plurality of locations on the first wearable item;
retrieve a second point cloud of a second wearable item from a database of an electronic marketplace, the second point cloud including a plurality of points corresponding to locations on the second wearable item;
compare the first point cloud to the second point cloud using a random sample consensus, the random sample consensus demonstrating an overall proximity of the plurality of points corresponding to locations on the first wearable item to the plurality of points corresponding to locations on the second wearable item; and
determine that the second wearable item corresponds in size to the first wearable item.

2. The system of claim 1, further comprising a reference transmitter affixed to the first wearable item, the reference transmitter including an accelerometer, wherein the memory includes instructions that, when executed by the at least one processor, further cause the system to:
determine that a first subset of the plurality of depth measurements corresponds to a first region of a plurality of regions of the first wearable item;
detect motion of the reference transmitter with the accelerometer;
determine that the motion of the reference transmitter caused a pose change of the first wearable item with respect to the scanning device; and
determine that a second subset of the plurality of depth measurements corresponds to a second region of the plurality of regions of the first wearable item based at least in part upon the pose change.

3. The system of claim 1, wherein determining the three-dimensional structure of the first wearable item further comprises:
determining that a first subset of the plurality of depth measurements corresponds to a first region of the first wearable item;
determining, in the image of the first wearable item, a pose change of the first wearable item with respect to the scanning device, the pose change causing the first region of the wearable item to be in a different position relative to the scanning device; and
determining that a second subset of the plurality of depth measurements corresponds to a second region of the first wearable item based at least upon the pose change.

4. The system of claim 1, wherein comparing the first point cloud to the second point cloud using a random sample consensus further comprises:
assigning a weight to a region in the first point cloud, the weight indicating a relative importance of the first region in determining an overall fit of the first wearable item;
determining a statistical similarity between the first point cloud and the second point cloud in the first region; and
generate a user recommendation for the second wearable item.

5. A computer-implemented method, comprising:
under the control of one or more computer systems configured with executable instructions,
causing a plurality of waves to be projected at a first item, wherein the plurality of waves comprise one of acoustic or electromagnetic waves;
detecting at least a portion of the plurality of waves being reflected from the first item;
determining a first plurality of points corresponding to locations on the first item based at least in part upon the portion of the plurality of waves being reflected;
generating a first point cloud of the first item based at least in part upon the plurality of points;
retrieving a second point cloud of a second item from a database of an electronic marketplace, the second point cloud including a second plurality of points corresponding to locations on the second item;
determining that a first point in the first point cloud corresponds to a second point in the second point cloud;
mapping the first point in the first point cloud to the second point in the second point cloud, the mapping including at least one transformation to transition between the first point and the second point;
iterating the mapping for additional points in the first point cloud to additional points in the second point cloud;
determining an overall map of the first point cloud to the second point cloud, the overall map including all transformations to transition between the first point cloud and the second point cloud; and
generating a user recommendation for the second item based on the overall map.

6. The computer-implemented method of claim 5, wherein the plurality of waves comprise acoustic waves produced by an ultrasound transmitter, and the plurality of reflections of the plurality of waves are detected at an ultrasound receiver.

7. The computer-implemented method of claim 5, wherein the plurality of waves comprise light pulses produced by a light radar (LIDAR) transmitter, and the plurality of reflections of the plurality of waves are detected at a LIDAR receiver.

8. The computer-implemented method of claim 5, wherein a scanning device projects the plurality of waves, and determining the plurality of points corresponding to locations on the first item further comprises:
   determining a plurality of depth measurements based at least in part upon detecting the plurality of reflections of the plurality of waves, each depth measurement indicating a distance between the scanning device and the first item.

9. The computer-implemented method of claim 8, further comprising:
   determining that a first subset of the plurality of depth measurements corresponds to a first region of the first item;
   determining a pose change of the first item with respect to the scanning device; and
   determining that a second subset of the plurality of depth measurements corresponds to a second region of the first item based at least in part upon the pose change of the item with respect to the scanning device.

10. The computer-implemented method of claim 9, wherein
   determining the pose change of the first item with respect to the scanning device further comprises:
   detecting a reference marker affixed to the first item;
   determining a first position of the reference marker;
   detecting movement of the reference marker;
   determining a second position of the reference marker based at least in part upon the movement; and
   determining the pose change of the first item based at least in part upon the second position of the reference marker.

11. The computer-implemented method of claim 10, wherein the reference marker comprises an accelerometer and an active transmitter, wherein detecting movement of the reference marker comprises detecting movement from the accelerometer, and wherein the reference marker transmits the first position and the second position to a computing system.

12. The computer-implemented method of claim 9, wherein determining the pose change of the first item with respect to the scanning device further comprises:
   capturing an image of the first item and the scanning device;
   determining, in a first frame of image data, a first pose of the first item with respect to the scanning device; and
   determining, in a second frame of image data, a second pose of the first item with respect to the scanning device.

13. The computer-implemented method of claim 5, wherein the first item comprises a first wearable item, the second item comprises a second wearable item, and further comprising:
   performing a random sample consensus between plurality of points of the first point cloud and a plurality of points of second point cloud; and
   determining that the three-dimensional structure of the first wearable item corresponds to the three-dimensional structure of the second wearable item based at least in part upon the random sample consensus.

14. The computer-implemented method of claim 13, determining that the three-dimensional structure of the first wearable item corresponds to the three-dimensional structure of the second wearable item further comprises:
   assigning a weight to a region in the first point cloud, the weight indicating a relative importance of the region in determining an overall fit of the first wearable item; and
   determining a statistical similarity between the first point cloud and the second point cloud in the region.

15. The computer-implemented method of claim 5, further comprising:
   receiving data related to the first item, the data describing a modification to the first item; and
   generating the user recommendation for a second item, the second item having a three-dimensional structure based at least in part upon (i) a three-dimensional structure of the first item and (ii) the modification to the first item.

16. The computer-implemented method of claim 5, further comprising generating a visual representation of the first point cloud on a display of a mobile device.

17. The computer-implemented method of claim 5, wherein generating the first point cloud of the item further comprises:
   determining that a first portion of the first point cloud includes at least a threshold number of points;
   determining that a second portion of the first point cloud does not include at least the threshold number of points;
   determining that the first portion of the first point cloud and the second portion of the first point cloud correspond to symmetrical regions of the first item; and
   generating additional points for the second portion of the first point cloud based at least in part upon determined points in the first portion of the first point cloud.

18. A system comprising:
   a scanning device, the scanning device comprising:
      a handle; and
      a substantially spherical head affixed to the handle, the substantially spherical head including a rotating transmitter and a rotating receiver, the rotating transmitter and the rotating receiver rotating in synchronization about a diameter of the substantially spherical head, the diameter substantially aligned with a central axis of the handle;
   at least one processor; and
   memory including instructions that when executed by the at least one processor, cause the system to:
   project a plurality of waves at a wearable item;
   detect at least a portion of the plurality of waves being reflected from the wearable item;
   determine a first plurality of points corresponding to locations on the wearable item based at least in part upon the portion of the plurality of waves being reflected;
   generate a first point cloud of the wearable item based at least in part upon the first plurality of points;
   retrieve a second point cloud of a second item from a database of an electronic marketplace, the second point cloud including a second plurality of points corresponding to locations on the second item;
   determine that a first point in the first point cloud corresponds to a second point in the second point cloud;
   map the first point in the first point cloud to the second point in the second point cloud;
   iterate the mapping for additional points in the first point cloud to additional points in the second point cloud;
   determine an overall map of the first point cloud to the second point cloud; and generate a recommendation for the second item based on the overall map.

19. The system of claim 18, wherein the scanning device further includes memory to store scanning data, the handle includes a data transfer connector, the rotating transmitter comprises a rotating light radar (LIDAR) transmitter, and the rotating receiver comprises a rotating LIDAR receiver.

20. The system of claim 19, wherein the wearable item includes an interior region and an opening to access the interior region, and the substantially spherical head of the scanning device is smaller than the opening.

* * * * *